United States Patent [19]

Finnemore

[11] 4,110,018

[45] Aug. 29, 1978

[54] PULL STRIP GUIDE FOR MULTIPURPOSE FILM CASSETTES

[75] Inventor: Fred M. Finnemore, North Reading, Mass.

[73] Assignee: Polaroid Corporation, Cambridge, Mass.

[21] Appl. No.: 791,035

[22] Filed: Apr. 26, 1977

[51] Int. Cl.$^2$ ............................................. G03C 11/00
[52] U.S. Cl. ...................................... 352/130; 242/199
[58] Field of Search ............. 352/130, 78 R; 308/215; 242/199

[56] References Cited

U.S. PATENT DOCUMENTS

| 1,275,715 | 8/1918 | Makutchan | 308/215 |
| 2,142,474 | 1/1939 | Langhaar | 308/215 |
| 3,921,190 | 11/1975 | Ell et al. | 352/130 |

*Primary Examiner*—Monroe H. Hayes

*Attorney, Agent, or Firm*—Frederick A. Goettel

[57] ABSTRACT

A multipurpose motion picture film cassette is provided of the type wherein rewinding the film strip after exposure results in attachment of a pull strip to the film strip and subsequent advancement of the pull strip, as rewinding continues, to effect the removal of a tear tab closure which releases film processing fluid from an initially sealed storage reservoir. The pull strip is initially supported and constrained to an essentially S-shaped tortuous path having at least two turning points about which the pull strip passes when being advanced by the film strip. The pull strip is supported at each of its turning points by a cylindrical roller which in turn is supported by an arcuate surface having a radius of curvature substantially equal to that of the outer surface of the roller. The arcuate surfaces are arranged and sized such that they support the rollers for relative rotation therewith when the pull strip is advanced thereby.

10 Claims, 5 Drawing Figures

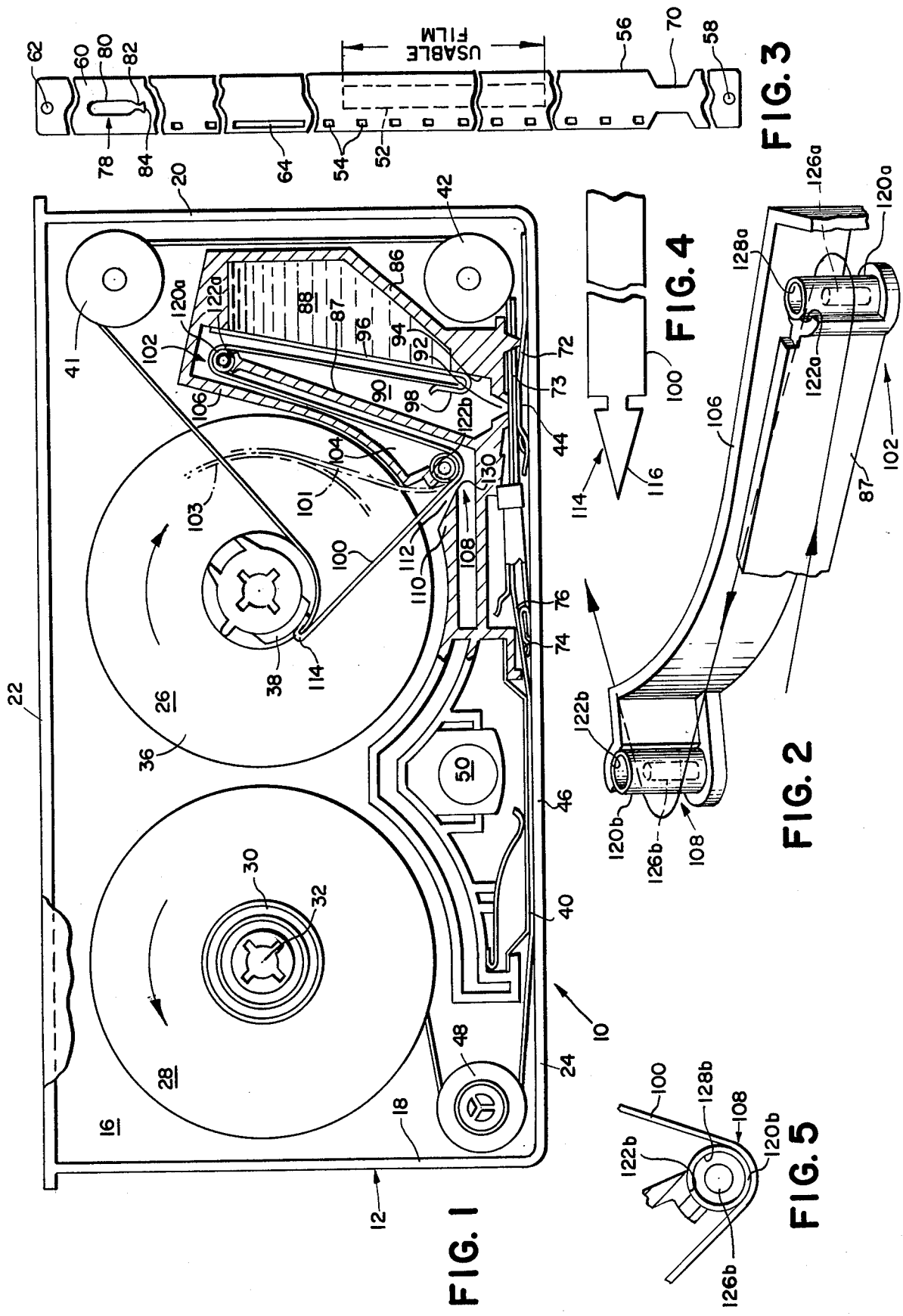

PULL STRIP GUIDE FOR MULTIPURPOSE FILM CASSETTES

BACKGROUND OF THE INVENTION

This invention relates to multipurpose photographic film strip cassettes in which the exposed film strip contained in the cassette may be processed, viewed by projection and rewound automatically without removal from the cassette in accordance with information supplied by the condition of the cassette and the film strip contained therein. More particularly, it concerns an improved apparatus for releasing processing fluid from an initially sealed reservoir forming part of a film processing organization of such cassettes.

Multipurpose photographic film cassettes have been developed for use in cinematographic systems illustrated and described, for example, in U.S. Pat. No. 3,615,127 issued to Edwin H. Land on Oct. 26, 1971; U.S. Pat. No. 3,623,417 issued Nov. 30, 1971 to Vaito K. Eloranta; U.S. Pat. No. 3,785,725 issued Jan. 15, 1974 to John F. Batter et al.; U.S. Pat. No. 3,895,862 issued July 22, 1975 to Joseph E. Stella et al.; and in a copending application Ser. No. 756,425, filed by W. A. Holmes and D. T. Scholz on Jan. 3, 1977, all of which are owned by the assignee of the present invention.

In such systems, a strip of photographic film contained in a cassette can be exposed in a camera adapted to receive the cassette and then processed to provide viewable images by placing the cassette in a viewing apparatus equipped to activate a cassette contained processor upon rewinding the exposed film strip. After processing in this manner, the viewing apparatus is operated as a projector to advance the film incrementally frame by frame past the light source so that the scene to which the film was exposed is reproduced in a manner well-known in the motion picture art.

In systems of the type aforementioned, the processing operation after film exposure and before viewing entails the deposition of a uniform coating of processing fluid along the length of the film strip to effect a diffusion transfer of a negative image in a light sensitive emulsion layer on the film strip to a positive image receiving layer or interface. The processing fluid supply is contained in an initially closed reservoir or pod housed within the film cassette, the reservoir having a removable tear tab closure capable of being opened upon activation of the processor by the viewing apparatus to allow the fluid to escape from the pod and pass through a nozzle-like opening against the exposed emulsion layer on the film strip. Although the processor is operated only once in any single cassette which provides a permanent housing for the film strip therein, its operation to achieve a uniform and complete layer of processing fluid over the exposed emulsion layer on the film strip is vital to satisfactory operation of the overall system since any defect in the operation of the processor will result in undesirable and permanent blemishes plainly observable during projection of the processed film.

To ensure retention of the processing fluid in the cassette contained reservoir or pod up to the time it is needed for the processing operation, and also in some measure to ensure complete availability of the processing fluid upon initial activation of the processor, the processing fluid reservoir in such systems is provided with a relatively large opening covered initially by a releasably bonded tear tab closure capable of being completely peeled from the opening to release the processing fluid for distribution against the emulsion layer of the exposed film strip. In prior systems of the type mentioned above, the tear tab initially sealing the processing fluid reservoir extends from one end of the reservoir opening to the other at which it is folded back on itself.

As described in the above-noted U.S. Pat. No. 3,895,862, no viewer mounted or other external means is needed for effecting a release of processing fluid from the initially sealed storage reservoir to initiate a processing cycle automatically upon rewinding the film strip after exposure in the cassette. The release of processing fluid from the reservoir is brought about by a pull strip extension connected at one end to a folded back portion of the reservoir sealing tear tab and having at its free end, a configuration adapted to engage in an aperture formed in the trailing end portion of the film strip attached to the supply spool during initial rewind rotation of the supply spool. The pull strip, which may be mylar or other similar material having the physical characteristics of a photographic film strip, is initially supported and constrained to an essentially S-shaped tortuous path in which the intermediate leg is established by a channel formed by internal cassette walls. The pull strip accordingly extends initially upward in confronting relation with the tear tab, then makes a downward turn passing through the aforementioned channel and makes a second turn at the lower end thereof before exiting from the channel. At its exit from the channel, the extension is bent back on itself without exceeding the elastic limits of the material from which it is made so that the projecting free end lies yieldably against the outer convolutions of the film strip on the supply spool. As the film strip pays out from the supply spool during exposure, the free end of the pull strip will move inwardly due to the diminishing diameter of film strip convolutions on the supply spool until the film strip is completely exposed. At this time, an aperture in the supply spool connected trailing end portion of the film strip will have passed the free end of the pull strip extension so that upon rewinding of the film strip back onto the supply spool, a latching tongue at the free end of the pull strip will engage in the film strip aperture and become entrained between successive convolutions of the film strip supply spool trailing end portion. Continued rewind rotation of the supply spool will effect a pulling action on the pull strip causing it to advance through the S-shaped tortuous path and correspondingly, resulting in peeling of the tear tab closure from the processing fluid reservoir to release the processing fluid for application thereof to the exposed film strip. After having been peeled completely from the processing fluid reservoir, the tear tab is disengaged from the pull strip by a knife-like formation at the exit of the channel formed by the internal cassette walls. The removed tear tab closure will remain in a storage chamber defined by the channel once the processing cycle has been complete.

In order to assure reliable separation of the tear tab from the processing fluid reservoir, the cassette components and the viewer drive system must be capable of imparting a significant force upon the tear tab through the pull strip. Several design considerations arise from this requirement; one of such considerations being that all components involved in transmitting the necessary force must be sufficiently strong to do so without failing. A second consideration is that minimizing drag due to friction in the force transmitting chain of components will minimize the torque that the viewer's drive mechanism must be capable of imparting in order to effect tear tab release. The support of the pull strip at the two turning points of the S-shaped path has proved to be a particularly weak link in satisfying the above considerations.

Several configurations have been used to support the flexible pull strip at the turning points necessitated by the S-shaped path of the strip. As shown in the above-referenced U.S. Pat. No. 3,895,862, one approach has been a conventional roller arrangement wherein a roller is journalled upon an upstanding pin formed in the cassette wall. Another approach also illustrated in U.S. Pat. No. 3,895,862 is an enlarged radius portion formed integrally with one of the channel forming walls.

The journalled roller arrangements presents the obvious problem that the mounting pin is like a cantilevered beam with great stress occurring when under load at the lower end where it is attached to the cassette wall. Accordingly, a large pin is required to adequately support the roller when the pull strip is being advanced thereby to remove the tear tab. Further, the larger the mounting pin is made, the greater the frictional forces developed between the pin and the inside diameter of the roller. Such friction results in a reluctance of the roller to rotate thereby increasing the drag upon the pull strip as it passes therearound.

The use of the enlarged radius portion has the disadvantage that the pull strip experiences greater frictional drag than would be the case with a rotating support where rolling friction would be experienced.

SUMMARY OF THE INVENTION

In accordance with the present invention, an improved multipurpose film cassette is provided particularly for use in motion picture photographic systems of the type aforementioned wherein rewinding the film strip after exposure in the cassette results in attachment of a pull strip to the film strip and subsequent advancement of the pull strip to effect the removal of a tear tab closure which releases film processing fluid from an initially sealed storage reservoir. The pull strip is initially supported and constrained to an essentially S-shaped tortuous path having at least two turning points about which the pull strip passes when being advanced by the film strip. The pull strip is supported at each of its turning points by a cylindrical roller which in turn is supported by an arcuate surface having a radius of curvature substantially equal to that of the outer surface of the roller. The arcuate surfaces are disposed and sized such that they support the rollers for relative rotation therewith when the pull strip is advanced thereby.

The rollers may be hollow and may be initially positioned in the cassette by small diameter pins formed with the cassette housing and extending into the hollow inside diameter of the roller. The pins are sized such that they serve only to generally locate the rollers and have no physical contact with the rollers when the pull strip is being advanced to effect tear tab removal.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will best be understood from the following description of the preferred embodiment when read in connection with the accompanying drawings wherein like numbers have been applied in the different figures to denote the same parts and wherein:

FIG. 1 is a side elevation of the film cassette of this invention with the front wall thereof cut away and other portions thereof in partial section to illustrate the internal working components;

FIG. 2 is a perspective partially schematic view illustrating the path of the pull strip extension and the support arrangements at the turning points thereof;

FIG. 3 is a fragmentary plan view of the film strip to be used in the cassette shown in FIG. 1;

FIG. 4 is an enlarged fragmentary plan view of the free end of the pull strip extension; and FIG. 5 is an enlarged view of the lower pull strip support arrangement of the cassette of FIG. 1.

DETAILED DESCRIPTION OF THE PREFERRED EMBODIMENT

In the drawings, a multipurpose cassette incorporating the improvement provided by the present invention is generally designated by the reference numeral 10. As shown in FIG. 1, the cassette includes a generally parallelepiped casing or housing 12 established by planar faces or side walls 14 and 16, end walls 18 and 20 and elongated top and bottom edge walls 22 and 24, respectively. A pair of spools respectively designated hereinafter as a supply spool 26 and a take-up spool 28 are supported rotatably in the housing by annular, light-tight bearings 30 on the spools engaged by complementing ring-like embossments (not shown) on the interior of the side walls 14 and 16. Also, each spool is provided with a drive socket 32 for engagement by appropriate drive shafts in either of the camera (not shown) or the viewing apparatus (not shown) with which the cassette is used in accordance with the overall system described in the prior references above cited. Each of the spools 26 and 28 is provided further with a pair of opposed flanges 34 and 36 affixed to opposite ends of central hubs 38 to which opposite ends of a film strip 40 are permanently connected. Although the film strip will be described in more detail below, it will be noted from FIG. 1 that the path of the film strip 40 in the housing 12 extends from the hub 38 of the supply spool 26 about guide rollers 41 and 42 across a normally inoperative film processing station 44, an opening 46 in the bottom edge wall 24, about a further guide roll 48 and to the take-up spool 28. The opening 46 functions at different times to facilitate both exposure and projection of the film strip 40, a prism 50 being located behind the film strip at the opening 46 to facilitate the latter operation.

The film strip 40 functions as an operating component in the cassette over and above its principal function of recording photographic images and is shown in its full length in FIG. 2 of the drawings. As shown, the film is provided with a major central portion 52 of useable film upon which projectable images may be formed. To this end, the film strip includes a carrier base of any suitably strong transparent material carrying an emulsion or photo-sensitive coating of any conventional variety; for example, an emulsion developed by a mono-bath processing composition to form a positive transparency suitable for projection. Also, a series of uniformly spaced sprocket holes 54 are provided along the length of the film to facilitate incremental film advance during exposure and projection. At least the carrier base of the strip extends beyond the end of the central portion of usable film 52 to provide at one end a leading end portion (take-up leader) 56 having an aperture 58 by which the take-up leader may be permanently affixed to the hub of the take-up spool 28. A trailing end portion (supply leader) 60 at the opposite end of the strip is similarly provided with an aperture 62 for permanent connection to the hub 38 of the supply spool 26. The strip is additionally provided with an elongated sprocket hole 64 of the approximate proportionate length illustrated in FIG. 2, for the purpose of interrupting advance travel of the strip by the incremental drive mechanisms provided in the camera (not shown) and the projecting apparatus (not shown) with which the cassette is used. The film strip is further provided in its take-up end 56 with a pair of side notches defining a necked down portion 70.

Turning again to FIG. 1, a balanced pressure pad 73 supported by a leaf spring 72 retains the film strip in operative relation to a processing fluid applicator nozzle 92 during processing. Additionally, the necked down portion 70 (see FIG. 2) functions at the end of the processing cycle to engage a pair of elongated parallel fingers 74 at one end of a valve member 76 and moves the valve member to seal the nozzle 92 at the processor station 44 at the end of the processing cycle. The operation of the balanced pressure pad 73 and the leaf spring 72 is more fully described in U.S. Pat. No. 3,951,530 issued to Frank M. Czumak et al. on Apr. 20, 1976 and is also owned by the assignee of the present invention.

The processing station sealing operation by the valve 76 is more fully described in the aforementioned U.S. Pat. No. 3,785,725 and in U.S. Pat. No. 3,868,716 issued on Feb. 25, 1975 to Irving S. Lippert et al, also owned by the assignee of the present invention. Since the above-noted patents fully describe these operations, no further discussion will be presented here.

As shown in FIG. 2, the supply leader 60 of the film strip 40 is provided with a discontinuity, preferably an aperture 78 of bottle-shaped configuration to provide a major aperture portion 80 extending in a direction away from the central film strip section 52 and connected by a necked-down portion 82 with an undercut or transverse slot-like portion 84. The function and operation of the aperture 78 will be described in more detail below.

With reference again to FIG. 1 of the drawings, it will be noted that the processing station 44 is formed in part by internal cassette transverse wall formations 86 and 87 defining in part a pair of chambers 88 and 90, the latter of which opens at its bottom to the processing fluid applicator nozzle 92 positioned to overlie the emulsion carrying surface of the film strip 40 as it passes between the cassette exposure-projection opening 46 and the guide roller 42. The chamber 88 constitutes an initially sealed reservoir for processing liquid and opens along one upright side to the chamber 90 at a planar face 94 to which a releasable tear tab closure 96 is initially affixed by bonding, fusion or the like. It should be noted that although the wall formation defining the respective chambers 88 and 90 as well as the nozzle 92 are depicted as one piece in FIG. 1 of the drawings, in practice the processing liquid handling functions served by the illustrated structure may be served equally well by more easily assembled separate components. For example, as shown in FIG. 1, the chamber 88 provides in itself an initially sealed processing liquid reservoir whereas in practice, the chamber may provide an internal receptacle for a prefabricated and self-contained pod of processing liquid to which the tear tab closure 96 is affixed in essentially the same manner as that shown in FIG. 1. In this way, cassette assembly can be facilitated without compromise in the achievement of a completely sealed reservoir for the processing fluid.

The tear tab 96, as shown in FIG. 1 of the drawings, extends from the top of the chamber 88 downwardly over the planar face 94 to the bottom of the chamber and near the nozzle 92 and is reversely folded or bent at its bottom to establish an upwardly directed leading end portion 98 secured by bonding, fusion or other suitable means to one end of a pull strip extension 100. For reasons which will become more apparent in the description to follow, the securement of the tear tab to the pull strip extension is in lap joint fashion so that the pull strip 100 initially lies within the reverse bend of the tear tab, which is important to the achievement of separation of the pull strip from the tear tab closure after these components have served their processing function.

The pull strip 100 extends upwardly from the lap joint with the tear tab closure 98 to a point adjacent the upper end of the interior cassette wall 86 where it passes around a first pull strip turning point support arrangement 102 which will be subsequently described in detail, and downwardly through a channel 104 defined in part by the wall formation 86 and in part by another transverse wall formation 106 spaced therefrom. The lower end of wall formation 106 forms part of a second pull strip turning point support arrangement 108 around which the pull strip 100 passes in a second reverse bend to establish the essentially S-shaped configuration of the pull strip. The second turning point support 108 cooperates with a wall portion 110 of the cassette to define an exit opening 112 from the channel 104. Prior to initiation of the processing cycle, the pull strip shown in phantom lines and identified as number 101 in FIG. 1 passes around the turning point defined by the second turning point support 108 and from there passes from the channel 104 through the exit opening 110 where it extends upwardly so that the free end of the pull strip 101 (shown in phantom) is in contact with the outermost convolution of the film strip (shown in phantom as number 103) carried by the supply spool and is biased thereagainst by the memory of the resilient pull strip.

As shown in FIG. 4, the free end portion 114 of the pull strip 100 is tapered and necked down to provide a latching tongue or arrow head tip 116 which is configured to engage the bottle shaped aperture 78 in the supply end leader 60 of the film strip upon initial rewind of the film strip back onto the supply spool 26, as is described in detail in aforementioned U.S. Pat. No. 3,895,862.

In FIG. 1 of the drawing, the pull strip 100 is shown following engagement and attachment to the film strip and is in the condition just prior to initiation of removal of the tear tab closure 96 by the pulling imparted thereupon by the pull strip extension 100. In this condition, the pull strip is in considerable tension thereby imparting a load to each of the two pull strip turning point support arrangements 102 and 108.

In the following detailed description of the turning point support arrangements 102 and 108, identification numerals having the letter *a* accompanying them will hereinafter be used to describe those elements and surfaces associated with the upper support arrangement 102 and those associated with the lower assembly 108 will bear the letter *b*. Each of the pull strip turning point support arrangements includes a relatively thin walled hollow, cylindrical support roller 120*a*, 120*b* positioned at the respective turning points of the pull strip 100 and which are adapted to engage and support the pull strip for low friction movement therepast when the pull strip is being advanced by the advancing film strip. Each of the rollers 120a, 120b is positioned adjacent an arcuate surface 122a, 122b integrally formed with a structural portion of an internal cassette wall. The arcuate roller engaging surfaces 122a, 122b are each defined by a radius substantially equal to the radius of the outer surface of the cylindrical elements 120a, 120b, respectively. Further, it will be noted that the arcuate surface 122a formed integrally with the upper end of the cassette wall 86 is disposed relative to the path of the pull strip 100 so that when the pull strip is advanced by the film strip, the substantially downward force which results upon the roller 120a is imparted diametrically opposite to the arcuate cylinder engaging surface 122a and accordingly also diametrically opposite to the surface of engagement between the portion of the outer surface of the cylindrical roller 120a in engagement with the arcuate surface 122a. Similarly, referring to the second turning point support arrangement 108, it will be seen that the arcuate surface 122b is so oriented that the engagement between it and the outer surface of the roller 120b will again be essentially diametrically opposite to the region of contact between the advancing pull strip 100 and the arcuate surface of the roller which it engages. Stated otherwise, the mid point of the engagement interface between the arcuate surface 122b and the cylindrical roller 120b may be said to lie along a line bisecting the angle defined by the portion of the pull strip 100 extending through channel 104 and that portion of the pull strip extending from the second turning point 108 towards the hub 38 of the film supply reel 26.

The above-described arrangements each result in the force imparted upon the pull strip guide rollers 122a, 122b being directed through the guide rollers towards their respective arcuate supporting surfaces 122a, 122b in a manner tending to encourage their engagement with the arcuate surfaces rather than rolling out of engagement therewith.

The materials from which the cylindrical rollers 120a, 120b and the arcuate supporting surfaces of the cassette are fabricated are chosen to minimize frictional resistance between the two at their interface to thereby facilitate rotation of the rollers relative to the arcuate surfaces. In order to permit this rolling contact, the frictional forces between the film and the outer surface of the cylindrical rollers 120a, 120b must exceed the frictional forces between the outer surfaces of the cylindrical rollers and their respective arcuate bearing surfaces. Accordingly, movement of the pull strip past the cylindrical rollers imparts rotational movement to the rollers so that they rotate relative to the cassette in engagement with the arcuate bearing surfaces. Such an arrangement results in the pull strip roller surface experiencing rolling friction with respect to the outer surface of the rollers which result in considerably lower frictional forces than the frictional forces that would be present were the rollers stationary with respect to the advancing pull strip.

Upon inspection of the drawing figures, it will be noted that pins 126a, 126b are provided on the cassette which are adapted to extend upwardly into the interior of each of the pull strip guide rollers 120a, 120b. The diameter of each of these pins 126a, 126b is substantially less than the inner diameter 128a, 128b of the cylindrical rollers 120a, 120b and they are provided only to facilitate assembly of the rollers 120a, 120b relative to their mating arcuate surfaces 122a, 122b. It should be appreciated, as best shown in FIG. 5 that, when the pull strip extension 100 is under tension and operating to remove the tear tab 96 and the pull strip is forcing the outer surfaces of the rollers 120a, 120b into engagement with their respective arcuate bearing surfaces 122a, 122b, the pins 126a, 126b have no contact whatsoever with the inner diameters 128a, 128b of the rollers 120a, 120b and accordingly no frictional forces are present between the pins and the interior of the rollers during operation of the tear tab removal apparatus. Accordingly, it will be appreciated that the pins 126a, 126b serve only to facilitate initial positioning of the cylindrical guide rollers 120a, 120b during assembly of the cassette and serve in no manner to support the rollers when the rollers are operative to guide the pull strip during tear tab removal.

Accordingly, following engagement of the latching tongue 116 of the pull strip extension 100 with the bottle-shaped aperture 78 in the supply leader 60 of the film strip, continued advancement of the film in the rewind direction results in advancement of the pull strip 100 through the above described S path, around the turning points 102, 108 and effects removal of the tear tab closure 96 from the planar face 94 of the fluid reservoir 88.

As shown in FIG. 1, the cassette wall portion 110 which cooperates with the lower pull strip turning point 108 to define the exit opening 112 includes a knife-like formation 130. As illustrated and described in detail in the abovereferenced U.S. Pat. No. 3,895,862, the relative orientation of the lower pull strip turning point guide arrangement 108 and the knife-like portion 130, coupled with the nature of the lap joint connection of the tear tab closure 96 to the pull strip 100, will effect a separation of the tear tab from the pull strips as the latter passes completely through the exit 112. In this regard, the leading end 98 of the tear tab 96 is not attached to the pull strip for a short distance, for example, 1/16 inch, such that the leading end tends to open or move away from the pull strip 100 as the latter turns around the cylindrical guide roller 120b at the lower turning point arrangement 108 and passes to the interior edge of the knife blade 130 so as to facilitate separation. Accordingly, the tear tab is thus removed from the pull strip and remains within the processor housing while the pull strip is free to pass outwardly through the exit 112.

Operation of the improved cassette of the present invention to effect exposure of the film strip 40 in a suitable camera is essentially the same as that disclosed in the aforementioned U.S. Pat. No. 3,785,725. Following exposure in the camera, the cassette 10 is placed in a projecting apparatus to be vertically oriented in the position illustrated in FIG. 1 of the drawings. The film strip 40 is initially advanced in the projecting apparatus until the pull strip end 114 is extended through the film strip opening 78. Thereafter, the projector is merely operated to rewind the film strip from the take-up spool 28 back to the supply spool 26. As the film strip is rewound, the latching tongue 114 becomes positively anchored by the aperture 78 and folded back on itself and the intervening film strip between successive convolutions on the supply spool. The establishment of this interlatched condition of the pull strip 100 with the film strip is depicted in FIG. 1 of the drawings.

With the free end of the pull strip extension 100 firmly secured between successive convolutions of the film strip 40, specifically the supply end leader 60 thereof, further rewinding rotation of the supply spool 26 will operate to pull the pull strip 100 through the S-shaped path in the manner described in detail hereinabove to effect opening of the reservoir 88, or, that is, a peeling removal of the tear tab closure 96 from the opening face 94 of the reservoir 88 as depicted in FIG. 4. This permits release of the fluid to the chamber 90 and through the nozzle 92 to the film strip under the influence of gravity. Further, in regard to relatively smooth wrapping of the pull strip 100 into the supply spool convolutions of film strip, the length (from the folded tip) of the pull strip 100 is made approximately equal or slightly less than the circumference of the spool hub so that the ends of the tab are substantially in alignment without overlap thereof.

When the end portion 98 of the tear tab closure is drawn to the channel exit 110, the knife-like formation 118 will separate the tear tab 96 from the pull strip 100. Advantageously, this stores the tear tab 96 separately from the pull strip 100 and within the processor housing 86.

Continuing with the operation, following separation of the pull strip 100 from the tab 96, the pull strip is wound onto the film spool 26 with the film strip 40, and the latter is coated with processing fluid flowing through the exit orifice 92 at the base of the chamber 90. At the completion of the rewind operation, when the take-up end 56 of the film strip 40 is reached, the film aperture 70 engages the valve member 76 and displaces the latter (to the right in the cassette as shown in FIG. 1) to close off the nozzle opening 92 and seal the processing station 44. Following this, the film is then advanced forwardly in stepwise fashion while illumination is directed through the prism 50 for projection or viewing of the recorded images. During this latter operation and subsequent operations, the pull strip 100 remains attached to the film strip 40 by means of its folded latch condition.

Thus it will be seen that by this invention there is provided an improved multipurpose photographic film cassette by which the above-mentioned objectives are completely fulfilled. It will be appreciated also that various modifications and/or changes can be made in the embodiment illustrated and described herein without meaningful departure from the present invention. It is expressly intended, therefore, that the foregoing description is illustrative of a preferred embodiment only, not limiting, and that the true spirit and scope of the present invention can be determined by reference to the appended claims.

What is claimed is:

1. A film cassette containing a strip of photographic film to be exposed and processed without removal from the cassette, comprising:
   a housing;
   means contained within said housing for processing the exposed film strip, said processing means including a processing fluid reservoir initially sealed by a tear tab closure to be removed by advancement of the tear tab upon completion of film exposure to release reservoir contained processing fluid for deposit on the film strip;
   a pull strip joined at one end to said tear tab; and
   means for guiding said pull strip along a predetermined path to advance said tear tab and release the processing fluid from said reservoir, said guiding means including at least one turning point and means for supporting the inner surface of said pull strip at said turning point, said supporting means comprising a cylindrical element having a first arcuate portion of its outer surface in contact with said inner surface of said pull strip and means for contacting and supporting at least the arcuate portion of said outer surface of said cylindrical element diametrically opposed from said first arcuate portion for rotational movement of said cylindrical element relative thereto as said pull strip is advanced thereby.

2. The apparatus of claim 1 wherein said cylindrical element is hollow and has an inside diameter and an outside diameter, said contacting and supporting means comprising a structural portion of said cassette defining an arcuate surface having a radius of curvature substantially equal to the curvature of said outside diameter.

3. The apparatus of claim 2 further including means for locating said cylindrical element within said housing comprising an upstanding pin structurally attached to said housing and extending into said hollow cylindrical element and sized such that said pin does not contact the inner surface of said cylindrical element when said outer surface is in engagement with said means for contacting and supporting.

4. The apparatus of claim 1 wherein said cylindrical element is hollow and has an inner surface and including means for locating said cylindrical element comprising an upstanding pin structurally formed with said housing and extending into said hollow cylindrical element and sized such that said pin does not contact said inner surface when said outer surface is in engagement with said means for contacting and supporting.

5. A film handling cassette comprising:
   a housing;
   an elongated film strip disposed within said housing;
   means for defining a predetermined path along which said film strip may be progressively advanced;
   means responsive to externally mounted actuating means for advancing said film strip along said predetermined path;
   a fluid applicator disposed within said housing, said fluid applicator including wall portions defining a concavity and a tear tab disposed generally vertically, when said cassette is located in its operative processing position, over said concavity to seal processing fluid in said concavity;
   a flexible pull strip having one end attached to the lower end of said tear tab and its other end being initially in uncoupled disposition and arranged to be subsequently coupled to a section of said film strip as said film strip is progressively advanced along said predetermined path; and
   means for disposing said pull strip along a folded path intermediate its two said ends, a section of said pull strip immediately adjacent its said one end being attached to said tear tab to exert an upward force on said tear tab when said other end of said pull strip is advanced along said predetermined path, said pull strip disposing means including a first generally vertically extending wall section spaced from said tear tab and terminating adjacent the upper end of said tear tab in a first means for supporting and guiding said upwardly extending pull strip in a downwardly directed turn, and a second generally vertically extending wall section spaced from said first wall section and extending downwardly from above the point of said pull strip's downward turn and terminating in a second means for supporting and guiding said downwardly extending pull strip in a generally upwardly directed turn, each of said first and second guide and support means comprising a cylindrical element having a first arcuate portion of its outer surface adapted to engage the innner surface of said pull strip at each of said pull strip's turning points and a structural portion of said housing defining an arcuate surface for engaging and supporting at least the arcuate portion of said outer surface of said cylindrical element diametrically opposed from said first arcuate portion for rotational movement of said cylindrical elements relative thereto as said pull strip is advanced thereby.

6. The apparatus of claim 5 wherein said structural portion of said housing defining an arcuate surface for said first guide means and said second guide means comprise, respectively, an integrally formed portion of the upper end of said first wall section, and an integrally formed portion of the lower end of said second wall section.

7. The apparatus of claim 5 wherein each of said cylindrical elements is hollow and has an inside diameter and an outside diameter, and each of said arcuate surfaces has a curvature substantially equal to the curvature of said outside diameter.

8. The apparatus of claim 7 further including means for locating each of said cylindrical elements within said housing, comprising an upstanding pin for each of said elements structurally attached to said housing and extending into said hollow cylindrical element and sized such that said pins do not contact the inner surfaces of said cylindrical elements when said outer surfaces are in engagement with said arcuate surfaces.

9. The apparatus of claim 1 wherein said cylindrical element has a pin receiving opening therein, said opening defining an inner surface, and including means for locating said cylindrical element comprising an upstanding pin structurally formed with said housing and extending into said pin receiving opening of said cylindrical element and sized such that said pin does not contact said inner surface when said outer surface is in engagement with said means for contacting and supporting.

10. A film cassette containing a strip of photographic film to be exposed and processed without removal from the cassette, comprising:
 a housing;
 means contained within said housing for processing the exposed film strip, said processing means including a processing fluid reservoir initially sealed by one end of an elongated strip closure to be removed by advancement of the strip closure upon completion of film exposure to release reservoir contained processing fluid for deposit on the film strip; and
 means for guiding said elongated strip closure along a predetermined path to advance said strip and effect removal of said initially sealed one end of said strip from said fluid reservoir to thereby release the processing fluid from said reservoir, said guiding means including at least one turning point and means for supporting the inner surface of said strip at said turning point, said supporting means comprising a cylindrical element having a first arcuate portion of its outer surface in contact with said inner surface of said elongated strip closure and means for contacting and supporting at least the arcuate portion of said outer surface of said cylindrical element diametrically opposed from said first arcuate portion for rotational movement of said cylindrical element relative thereto as said elongated strip is advanced thereby.

* * * * *